US009684170B2

(12) United States Patent
Simmonds

(10) Patent No.: US 9,684,170 B2
(45) Date of Patent: Jun. 20, 2017

(54) DISPLAYS

(71) Applicant: BAE SYSTEMS plc, London (GB)

(72) Inventor: Michael David Simmonds, Rochester-Kent (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/650,686

(22) PCT Filed: Nov. 27, 2013

(86) PCT No.: PCT/GB2013/053136
§ 371 (c)(1),
(2) Date: Jun. 9, 2015

(87) PCT Pub. No.: WO2014/091201
PCT Pub. Date: Jun. 19, 2014

(65) Prior Publication Data
US 2015/0316768 A1    Nov. 5, 2015

(30) Foreign Application Priority Data

Dec. 10, 2012   (EP) ..................................... 12275197
Dec. 10, 2012   (GB) .................................. 1222162.8

(51) Int. Cl.
*G02B 27/01*       (2006.01)
*G06K 9/76*        (2006.01)
*H04N 9/31*        (2006.01)

(52) U.S. Cl.
CPC ..... *G02B 27/0172* (2013.01); *G02B 27/0103* (2013.01); *G02B 27/0176* (2013.01);
(Continued)

(58) Field of Classification Search
CPC .. G02B 27/01; G02B 27/017; G02B 27/0101; G02B 27/0172; H04N 9/3197; G09G 2310/0235; G09G 3/346
See application file for complete search history.

(56) References Cited

U.S. PATENT DOCUMENTS 8,467,133 B2 *   6/2013  Miller ................. G02B 27/017
                                                        353/28
9,223,134 B2 *  12/2015  Miller ................ G02B 27/0093
(Continued)

FOREIGN PATENT DOCUMENTS

EP       1808722 A2      7/2007
WO    2011051660 A1      5/2011
(Continued)

OTHER PUBLICATIONS

International Preliminary Report on Patentability and Written Opinion received for Patent Application No. PCT/GB2013/053136, mailed on Jun. 25, 2015. 9 pages.
(Continued)

*Primary Examiner* — Ricardo L. Osorio
(74) *Attorney, Agent, or Firm* — Finch & Maloney PLLC

(57) ABSTRACT

A display apparatus is described that comprises an optical ocular part (3) arranged for viewing a scene therethrough, and a waveguide display part (6) arranged for guiding image-bearing light to a transparent display output area (16) thereof and thereat displaying the image. The ocular part and/or the waveguide display part are positioned, or are arranged to be positioned, mutually in register for viewing simultaneously the scene with the displayed image incorporated in it, through the transparent display output area. A focuser part (17) positioned in register with the display output area focuses simultaneously the scene and the incorporated image for focused viewing by a user (13).

15 Claims, 3 Drawing Sheets

(52) U.S. Cl.
    CPC ............ *G06K 9/76* (2013.01); *H04N 9/3197* (2013.01); *G02B 2027/0123* (2013.01); *G02B 2027/0132* (2013.01); *G02B 2027/0138* (2013.01); *G02B 2027/0154* (2013.01); *G02B 2027/0156* (2013.01); *G02B 2027/0174* (2013.01)

(56) References Cited

U.S. PATENT DOCUMENTS

| | | | |
|---|---|---|---|
| 9,341,843 B2* | 5/2016 | Border | ............... G02B 27/0093 |
| 2008/0143639 A1 | 6/2008 | Gerbe et al. | |
| 2011/0254855 A1 | 10/2011 | Anders | |
| 2015/0309316 A1* | 10/2015 | Osterhout | ............... G06F 1/163 345/8 |

FOREIGN PATENT DOCUMENTS

| | | |
|---|---|---|
| WO | 2011133140 A2 | 10/2011 |
| WO | 2014091201 A1 | 6/2014 |

OTHER PUBLICATIONS

International Search Report received for Patent Application No. PCT/GB2013/053136, mailed on Apr. 1, 2014. 5 pages.

GB Intellectual Property Office Search Report under Section 17(5) received for GB Patent Application No. 1222162.8, mailed Apr. 9, 2013. 3 pages.

Partial European Search Report received for EP Patent Application No. 12275197.7, mailed Apr. 16, 2013. 5 pages.

\* cited by examiner

DISPLAYS

The present invention relates to displays, and particularly, though not exclusively, to head-up displays such as head-mounted displays and the like.

Head-mounted displays may employ transparent waveguide displays designed to generate an image via a transparent display screen through which an external scene is viewed by the helmet wearer (e.g. the view from a cockpit of an aircraft). The image thereby forms an overlay to the viewed scene and may comprise flight information (speed, altitude, positional information etc.). When it is necessary to employ additional optical aids, such as monocular or binocular elements in the form of night-vision viewers/goggles (NVG) or the like, a focal mismatch may arise between the optical output of the waveguide display and the additional optical aid. In particular, the user of a night-vision viewer invariable will wish to set the focus of the NVG in the region of −1.0 Dioptres. This may lead to a loss in conformal display accuracy at the waveguide exit pupil and will cause user discomfort.

The invention seeks to address these matters.

In a first aspect, the invention may provide a display apparatus comprising: an optical ocular part arranged for viewing a scene therethrough; a waveguide display part arranged for guiding image-bearing light to a transparent display output area thereof and thereat displaying the image; wherein the ocular part and/or the waveguide display part are positioned or are arranged to be positioned mutually in register with one another for viewing simultaneously the scene with the displayed image incorporated therein through the transparent display output area; and, a focuser part positioned in register with the display output area for focussing simultaneously the scene and the incorporated image for focussed viewing by a user. In this way, the focuser may apply a desired focussing of the combined light of the guided image from the waveguide display part and the light of the scene viewed through the ocular part. The ocular part may be adjustable to adjust the focus thereof (e.g. in the range from about −1.0 Dioptres to about +6 Dioptres).

The waveguide display part may comprise a planar waveguide display. The ocular part may be comprised within a monocular lens assembly which is either a lone lens assembly or forms one lens assembly within a binocular lens assembly.

The waveguide display part may be arranged to output the image-bearing light at the display output area as collimated light. The ocular part may be arranged or may be adjustable to output to the display output area collimated light conveying the scene. The optical output of the ocular part and of the waveguide display part may each comprise collimated light. The focuser part may thus be arranged to apply a focussing to the collimated combined light of both the ocular part and the waveguide display part.

The focuser part may be arranged or operable to possess a negative optical power thereby to diverge light received thereby from the display output area. For example, focuser part may be arranged to provide an optical power in the range from about 0 (zero) Dioptres to about −2 Dioptres, or more preferably between −0.5 Dioptres to about −1.5 Dioptres, e.g. about −1.0 Dioptres.

The focuser part may be switchable between a first state in which it possesses substantially no optical power and a second state in which it possesses an optical power for focussing light received thereby from the display output area.

The ocular part may be moveably connected to the waveguide display part and is moveable between a first position in which it is not in said register with the waveguide display part and a second position in which it is so in register.

The focuser part is preferably arranged to switch from the first state to the second state when the ocular part is moved from the first position into the second position. The focuser part may be arranged to switch from the second state to the first state when the ocular part is moved from the second position into the first position.

In a second of its aspects, the invention may provide a method of displaying a scene comprising: providing an optical ocular part and viewing a scene therethrough; providing a waveguide display part and guiding image-bearing light to a transparent display output area thereof and thereat displaying the image; positioning the ocular part and the waveguide display part mutually in register with one another and viewing simultaneously the scene with the displayed image incorporated therein through the transparent display output area; and, providing a focuser part positioned in register with the display output area and therewith focussing simultaneously the scene and the incorporated image-bearing light for focussed viewing by a user.

The method may include outputting from the waveguide display part the image-bearing light as collimated light at the display output area, and outputting to the display output area collimated light from the ocular part conveying the scene.

According to the method the focuser part may be arranged or be operable to possess a negative optical power, the method may include diverging light received thereby from the display output area.

The focuser part is preferably switchable between a first state in which it possesses substantially no optical power and a second state in which it possesses an optical power for focussing light received thereby from the display output area. The ocular part may be moveably connected to the waveguide display part and is preferably moveable between a first position in which it is not in said register with the waveguide display part and a second position in which it is so in register.

The method may include switching the focuser part from the first state to the second state by moving the ocular part from the first position into the second position.

The method may include switching the focuser part from the second state to the first state by moving the ocular part from the second position into the first position.

The focuser part may be arranged or be operable (e.g. switchable) to possess a negative optical power thereby to diverge light received thereby from the display output area.

An illustrative but non-limiting example of the invention shall now be described with reference to the accompanying drawings of which:

Figures 4A, 4B:
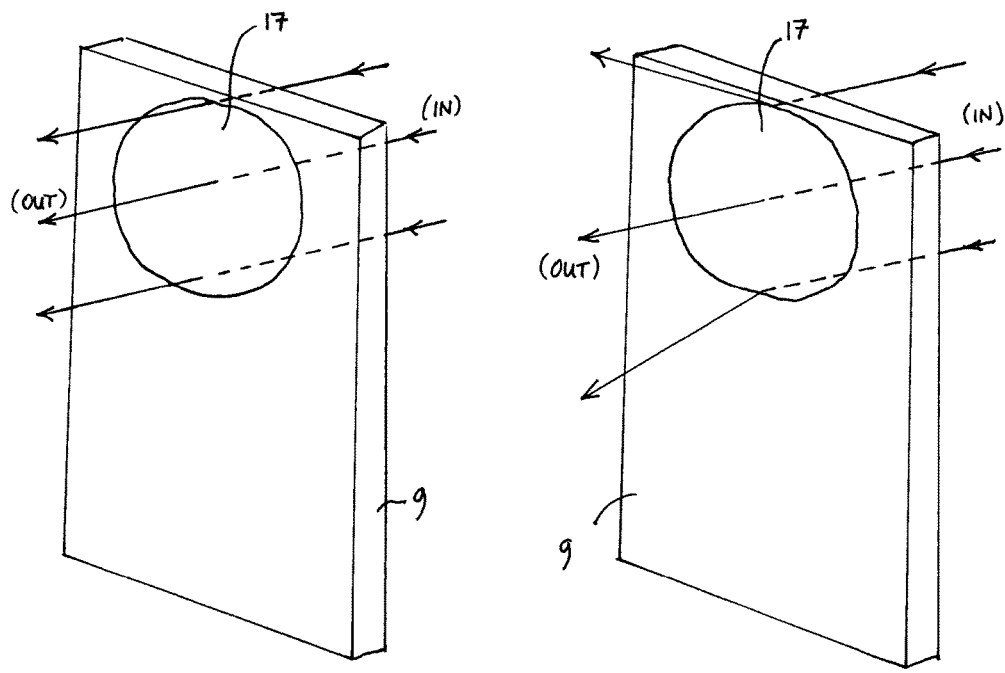
Figure 3:
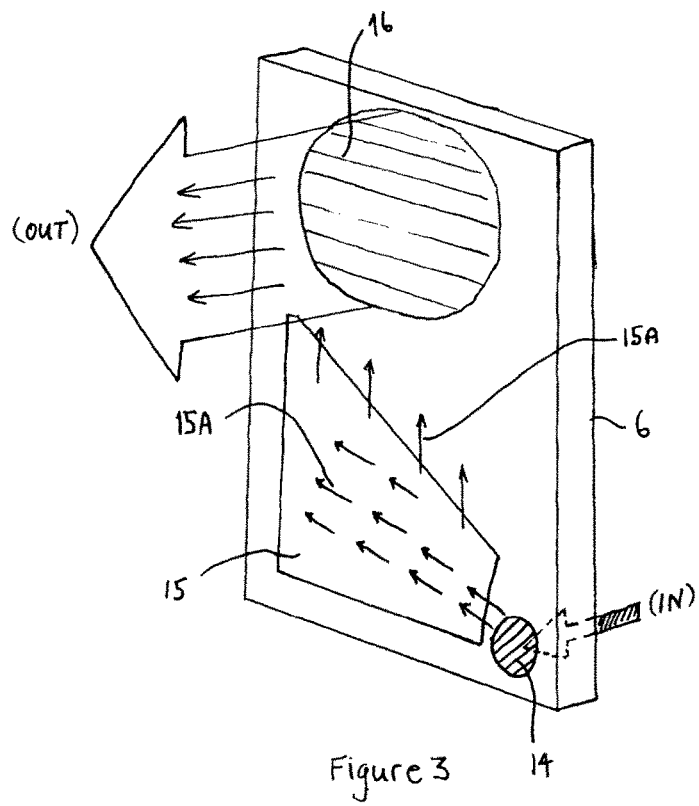
Figure 5:
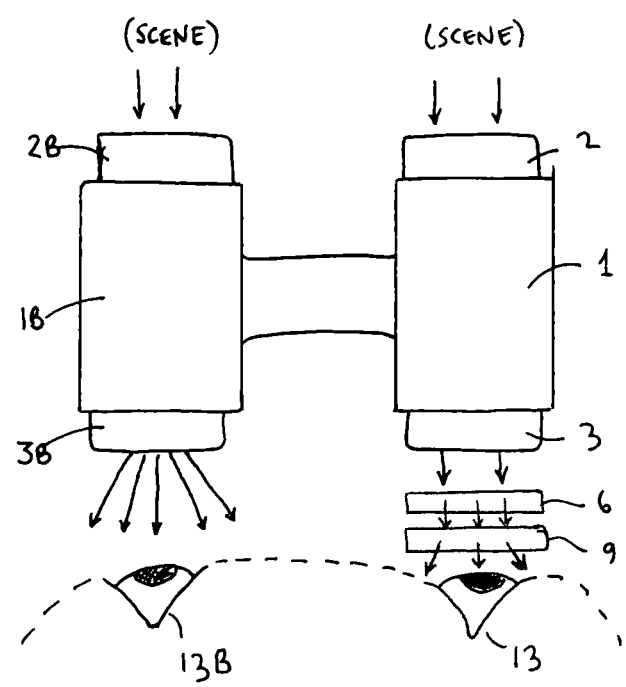

FIG. 3 schematically illustrates a slab waveguide display;

FIGS. 4A and 4B show two switched states of a switchable holographic Bragg grating unit;

FIG. 5 shows a binocular night vision goggles (NVG) according to an embodiment the invention.

In the drawings, like articles are assigned like reference symbols.

Figure 1:
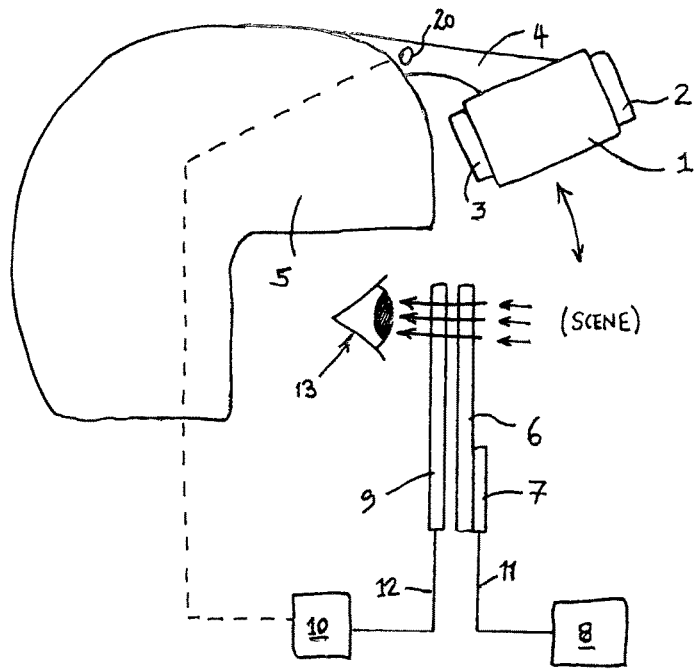
FIG. 1 is a schematic view of a helmet-mounted display apparatus according to the invention, comprising a pair of night-vision goggles (NVG) attached to a helmet and positioned in a stowed position.

Referring to FIG. 1, there is shown a helmet mounted display apparatus comprising an optical ocular part (1, 2, 3) which is one of two separate and parallel monocular components of a pair of binoculars of a night-vision goggle (NVG) unit. The NVGs are arranged for viewing a night-time scene therethrough and include an objective lens part (2) optically coupled to an eyepiece lens part (3) via an image intensifier part (1) arranged to intensify an image of a scene formed by the objective lens part for viewing via the eyepiece part. The NVGs may be such as would be readily available and/or apparent to the skilled person.

The display apparatus includes a planar waveguide display part (6) comprising an image generator part (7) for generating image-bearing light, and a planar waveguide upon or within which is formed two or more diffraction gratings (e.g. Bragg gratings). The image generator part is in communication with an image controller part (8) arranged to generate image data (digital or analogue) and to control the image generator part according to the image data to generate an image accordingly for display.

A first such diffraction grating defines a waveguide input region for receiving image-bearing light from the image generator part (7) and for diffracting image-bearing light into the planar (e.g. slab) waveguide for guiding therealong to a transparent display output area thereof and thereat displaying the image. A second such diffraction grating located at the output area is arranged to diffract out of the waveguide the guided image-bearing light from the waveguide input region.

The eyepiece part (3) and the waveguide display part are shown positioned (and are arranged to be moveably positioned) mutually in register for the viewing simultaneously an external night-time scene such that a display image from the image generator part is incorporated in the scene through the transparent display output area of the waveguide part (6).

A switchable holographic lens part (9) is positioned in register with the display output area of the waveguide part (6) for focussing simultaneously the night-time scene produced by the NVG (1, 2, 3) and the incorporated image-bearing light for focussed viewing by a user. (13).

Figure 2:
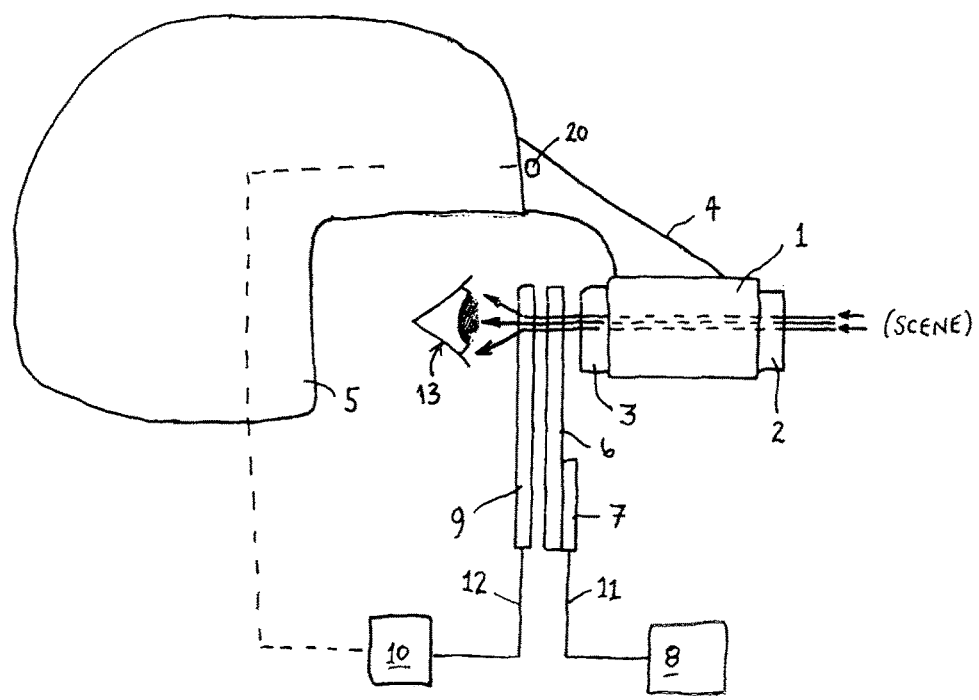
FIG. 2 is a schematic view of a helmet-mounted display apparatus according to the invention, comprising a pair of night-vision goggles (NVG) attached to a helmet and positioned in a deployed position to permit viewing of a scene therethrough by a user.

The waveguide display part is arranged to output the image-bearing light at the display output area as collimated light. The eyepiece part (3) of the ocular part is arranged to be adjustable in optical power to enable a user to control the focus of the scene-bearing light output thereby. When used in isolation, a typical pair of NVGs would be arranged with an eyepiece of negative optical power set to diverge the scene-bearing light output thereby to achieve a close focus for use by a user/wearer of the NVGs. However, this conflicts with the collimating output power (e.g. substantially/effectively zero, or negligibly small optical power) of the planar waveguide which does not bring image-bearing light to a close focus. When the waveguide part and the NVG ocular part are used together, as shown in FIG. 2, the state of focus of scene-bearing light and the state of focus of the image-bearing light is adjusted to render them consistent and optimal. This avoids the visual discomfort a user will otherwise suffer and permits the display apparatus to display both a night-time scene and the image conveyed by the waveguide part concurrently (the latter overlaid on the former) at the display output area of the waveguide part via collimated light conveying both the night-time scene and the guided image from the image generator part (7).

The switchable holographic lens comprises an electrically switchable transmissive Bragg grating formed on a transparent substrate. It is structured to define a holographic optical lens which has a negative optical power (e.g. −1.0 Dioptres) when activated electrically, and has effectively/substantially no optical power when not electrically activated (e.g. effectively zero Dioptres). When activated, the holographic lens is thereby arranged to diverge light received thereby from the display output area to bring it to a close focus desired by a user. The light so focussed is received by the holographic lens as collimated light conveying both the night-time scene from the NVGs and the image-bearing light originating from the image generator part (7).

The focuser part may be switchable according to a switch control unit (10) between a first state shown in FIG. 1 in which it possesses substantially no optical power and a second state shown in FIG. 2 in which it possesses an optical power for focussing light received thereby from the display output area.

The ocular part of the NVGs is moveably connected via a pivotable connection arm (4) to a helmet (5) to which the waveguide display part is connected or fixed. The ocular part is (e.g. pivotingly) moveable relative to the helmet between a first "stowed" position (FIG. 1) in which it is not in register with the waveguide display part and a second "deployed" position (FIG. 2) in which it is so in register.

The control unit is arranged to control the focuser part to switch from the first state to the second state when the ocular part is moved from the stowed position into the deployed position, and similarly, to switch from the second state to the first state when the ocular part is moved from the deployed position into the stowed position. In this way, with the holographic lens part switched "off" (i.e. no lens) the optical waveguide part is able to be used when the NVGs are in the stowed position and the user's eyes naturally focus to receive collimated image-bearing light from the waveguide part when viewing the environment through the display area of the waveguide part—e.g. during the daytime. Conversely, when it is desired to use the NVGs while still using the waveguide display part, the holographic lens is switched on and the eyepiece of the NVG ocular set to collimate its output. This enables the light output of both the ocular and the waveguide part to be suitably close-focussed by the holographic lens with optimal comfort for the user. In effect, the holographic lens serves the function which is usually served by the eyepiece of the NVG ocular, while allowing the image conveyed by the waveguide to be comfortably incorporated into the overall scene viewed by the user (13).

FIG. 3 shows schematically an optical waveguide suitable for the waveguide display part (6). The optical waveguide is a slab waveguide comprising a first (input) diffractive grating region (14) arranged to receive image-bearing light from the image generator part (7) and to diffract the received light along the optical waveguide by total internal reflection between the planar surfaces of the slab waveguide. An intermediate diffraction grating (15) is optically coupled to the first diffractive grating region by the optical waveguide to receive the diffracted light from the first grating and to expand the received light in a lateral dimension by diffraction as shown by arrows (15A). A second (output) diffractive grating region (16) is optically coupled to the intermediate diffraction grating by the optical waveguide to receive the expanded light and to output the received expanded light from the optical waveguide by diffraction thereby to display the image conveyed by the image-bearing light when input at the first (input) diffraction grating (14).

The image projector part (7) may be a micro-display pico-projector, such as would be readily available to the skilled person. For example, the pico-projector may include an illumination source (if required), a micro-display area, and one of more lenses and optical components arranged to collimate an image from the micri-display area and inject it into the waveguide. For example, the micro-display may be a reflective LCoS (Liquid crystal on silicon) device, which is a micro-projection or micro-display technology well known in the art. Alternatively, the micro-display may be DMD (digital micro-mirror device) also well known in the art, which may comprise a chip having on its surface many microscopic mirrors arranged in an array which correspond to the pixels in an image to be displayed. The mirrors can be individually rotated to an on or off state to collectively generate an image to be displayed via reflected light.

FIGS. 4A and 4B schematically show the switchable holographic lens unit in an un-activated state ("off") in which no holographic lens is present (FIG. 4A) and also in an activated state ("on") in which a holographic lens is generated. The unit comprises an electrically switchable transmissive Bragg grating (17) formed on a transparent substrate (9) of plastic or glass of other suitable optically transmissive material such as would be readily apparent to the skilled person. The switchable transmissive Bragg grating may comprise a Bragg grating recorded into liquid crystal such as is known in the art. An example of this is described in "*Electro-optic properties of switchable gratings made of polymer and nematic liquid-crystal slices*" by A. d'Alessandro et al.: Jun. 15, 2004/Vol. 29, No. 12/OPTICS LETTERS. An alternative is to use a liquid crystal switchable lens such as is described in EP0693188B1.

It is structured to define a holographic optical lens which has a negative optical power (e.g. −1.0 Dioptres) when activated electrically by application of electrical voltage to cause the distribution of refractive index across the surface of the unit (9) to vary in such a way as to define the Bragg grating. Removal of the electrical voltage removes the pattern of refractive index and causes the Bragg grating to disappear.

Thus, when no electrical voltage is applied the unit has effectively/substantially no optical power (e.g. effectively zero Dioptres). When activated, the holographic lens is thereby generated and is arranged to diverge light received thereby from the display output area (16) of the optical waveguide part (6) to bring it to a close focus desired by a user, as shown in FIG. 4B.

The switch control unit (10) is arranged to selectively apply/remove the required voltage to the switchable Bragg grating unit (9) to cause it to switch between the first state shown in FIGS. 1 and 4A in which it possesses substantially no optical power and the second state shown in FIGS. 2 and 4B in which it possesses negative optical power. The switch control unit (10) may, in preferred embodiments be connected to an external switch element (20) formed in the pivotable connection arm (or alternatively in the helmet 5) which is arranged to adopt automatically a first switch state when the NVGs are in the stowed position (FIG. 1) and to adopt automatically a second state when the NVGs are in the deployed position (FIG. 2). The switch control unit (10) is arranged, in such embodiments, to be responsive to the external switch element when in the first state to not activate the switchable Bragg grating, and to be responsive to the external switch element when in the second state to activate the switchable Bragg grating. In this way, the switchable Bragg grating may be automatically activated when the NVGs are deployed. In other embodiments, the external switch unit may be simply a hand-operated switch operable directly (manually) by the user.

The setting of the focus of an ocular of the NVGs may be performed manually by the wearer by adjustment of the eyepiece(s) thereof. An appropriate eyepiece may thus be manually adjusted to collimate by the wearer.

FIG. 5 shows schematically how a pair of NVG oculars may be used with the waveguide display part and the focuser part of the invention in a preferred embodiment. Only one of the two oculars is arranged in combination with a waveguide display part (6) and focuser part (9). That ocular (13) is arranged to output collimated light from a viewed scene, whereas the other ocular (1B, 2B, 3B) of the pair is arranged to output divergent light close-focussed via eyepiece (3B) optical elements possessing negative optical power (e.g. about −1.0 Dioptres). The negative optical power of that other ocular (3B) is substantially matched by the negative optical poser of the focuser unit (9) with the result that the user sees a given scene through both eyes (13 and 13B) appropriately focussed with an image from an image generation unit (7) superimposed thereupon in the view through one eye (13).

As can be observed from FIGS. 1, 2 and 5, the planar waveguide display part (6) and the switchable holographic lens part (9) are arranged in the field of view of a user (13) such that the user (13) will view the scene and information generated by the image controller part (8) superimposed upon the view of the scene. Furthermore, the planar waveguide display part (6) and the switchable holographic lens part (9) are arrange such that the optical ocular part (1, 2, 3), which is one of two separate and parallel monocular components of a pair of binoculars of a night-vision goggle (NVG) unit, can be moved between stowed and deployed position such that the planar waveguide display part (6) and the switchable holographic lens part (9) are positioned between the eye of the user and the optical ocular part (1, 2, 3). This means that when the optical ocular part (1, 2, 3) is in the stowed position (FIG. 1) the planar waveguide display part (6) can provide symbology or imagery to overlay the forward scene and when the optical ocular part (1, 2, 3) is moved to the deployed position (FIG. 2) the planar waveguide display part (6) and the switchable holographic lens part (9) do not interfere with deployment whilst being able to provide symbology or imagery to overlay the enhanced night vision forward scene. Accordingly, this allows the image bearing light to be generated between the user's eye and an image intensifier of the ocular part (1, 2, 3).

The embodiments described above are intended as non-limited examples of the invention the scope of which is intended to encompass variants, modifications and equivalents to the examples such as would be readily apparent to the skilled person.

The invention claimed is:
1. A display apparatus comprising:
an optical ocular part for viewing a scene therethrough; and
a waveguide display part arranged for guiding image-bearing light from an image generator part to a transparent display output area of the waveguide display part such that the image-bearing light is viewable combined with light from the scene passing through the transparent display output area,
wherein at least one of the ocular part and the waveguide display part is moveable relative to the other between a stowed relative position and a relative position of alignment such that when in the relative position of alignment, light from the scene viewable through the ocular part is arranged to pass through the transparent display output area and to be viewable combined with the image-bearing light, the display apparatus further comprising a switchable focuser part positioned in alignment with the display output area for focusing simultaneously light from the scene viewable through the ocular part, when the waveguide display part and the ocular part are in the relative position of alignment, combined with the image-bearing light for focused viewing by a user, wherein the state of focus of the light from the scene after passing through the optical ocular part is consistent with the state of focus of the image-bearing light.

2. The display apparatus according to claim 1, in which the image-bearing light is collimated and the ocular part is arranged or is adjustable to output to the display output area collimated light from the scene.

3. The display apparatus according to claim 1, in which the focuser part is arranged or operable to possess a negative optical power thereby to diverge light received from the display output area.

4. The display apparatus according to claim 1, in which the focuser part is switchable between a first state in which it possesses substantially no optical power and a second state in which it possesses an optical power for focusing light received from the display output area.

5. The display apparatus according to claim 4, in which the ocular part is moveably connected to the waveguide display part and is moveable between a first position in which it is in the stowed relative position with respect to the waveguide display part and a second position in which it is in the relative position of alignment with respect to the waveguide display part.

6. The display apparatus according to claim 5, in which the focuser part is arranged to switch from said first state to said second state when the ocular part is moved from said first position into said second position.

7. The display apparatus according to claim 5, in which the focuser part is arranged to switch from said second state to said first state when the ocular part is moved from said second position into said first position.

8. The display apparatus according to claim 5, further comprising a switch element arranged to detect a change in relative position of the ocular part and the waveguide display part from the first position to the second position and from the second position to the first position thereby to switch the focuser part from the first state to the second state and from the second state to the first state, respectively.

9. The display apparatus according to claim 1, in which the waveguide display part comprises a planar waveguide display.

10. The display apparatus according to claim 1, in which the ocular part is comprised within a monocular lens assembly.

11. The display apparatus according to claim 1, in which the ocular part is comprised within one lens assembly within a binocular lens assembly and not within another lens assembly of the binocular lens assembly.

12. The display apparatus according to claim 11, wherein each lens assembly of the binocular lens assembly includes an independently adjustable eyepiece lens such that the eyepiece lens of the lens assembly comprising the ocular part may be independently adjusted such that the state of focus of the light from the scene after passing through the ocular part is consistent with the state of focus of the image-bearing light.

13. The display apparatus according to claim 12, in which the focuser part is switchable between a first state in which it possesses substantially no optical power and a second state in which it possesses an optical power for focusing light received from the display output area, wherein the eyepiece lens of the lens assembly comprising the ocular part is arranged to output collimated light from the scene and the eyepiece lens of the other lens assembly of the binocular lens assembly is arranged to output focused light from the scene, such that the optical power of the eyepiece lens of the other lens assembly is substantially matched by the optical power of the focuser part when switched to said second state.

14. The display apparatus according to claim 11, in which the ocular part is comprised in a lens assembly of a night vision goggle system.

15. The display apparatus according to claim 1, in which the switchable focuser part comprises a switchable transmissive Bragg grating.

* * * * *